United States Patent [19]

Roberts et al.

[11] 3,964,065

[45] June 15, 1976

[54] STEERABLE ANTENNA NULL COMBINER SYSTEM

[75] Inventors: Eugene L. Roberts, Maitland; Thomas J. Steffancin, Orlando, both of Fla.

[73] Assignee: The United States of America as represented by the Secretary of the Army, Washington, D.C.

[22] Filed: Dec. 17, 1974

[21] Appl. No.: 533,562

[52] U.S. Cl. .................... 343/100 LE; 343/100 SA
[51] Int. Cl.² .......................................... H04B 7/00
[58] Field of Search .............. 343/100 SA, 100 LE, 343/854

[56] References Cited
UNITED STATES PATENTS

| | | | |
|---|---|---|---|
| 3,177,489 | 4/1965 | Saltzberg | 343/100 |
| 3,611,401 | 10/1971 | Connolly | 343/100 SA |
| 3,781,878 | 12/1973 | Kirkpatrick | 343/100 SA |
| 3,889,227 | 6/1975 | Takamizawa et al. | 343/100 LE |

Primary Examiner—Maynard R. Wilbur
Assistant Examiner—T. M. Blum
Attorney, Agent, or Firm—Nathan Edelberg; Jeremiah G. Murray; Frank Dynda

[57] ABSTRACT

A system employing broadband radio frequency vector multipliers in a balancing process for nulling out unwanted radio frequency signals. The nulling is achieved by adjustment of both the desired and interference signals as they pass through the system. The adjustment is accomplished by using vector multipliers which shift the phase by equal amounts and vary the amplitude by proportionate amounts of one or more radio frequency signals in response to separate phase shift and amplitude control forces. To obtain a desired phase shift, an incoming radio frequency signal is split into 0° and 90° components. By multiplying the 0° component by the cosine of the desired phase shift angle, multiplying the 90° component by the sine of the desired phase shift angle, and then summing the results, the signal can be phase shifted by any amounts through all four quadrants. The phase shift and amplitude control forces may be operator initiated or may be initiated through control processing to maximize the relative strength of the desired signal with respect to the interference signal.

16 Claims, 9 Drawing Figures

STEERABLE ANTENNA NULL COMBINER SYSTEM

FIELD OF THE INVENTION

This invention relates to a steerable antenna null combiner unit, and more particularly to the use of broadband radio frequency vector multipliers in a system for reducing interference or jamming. The system is operable in automatic, semi-automatic, and manual modes.

DESCRIPTION OF THE PRIOR ART

Interference in radio communication is the disturbance of reception due to stray or undesired signals. Jamming is the intentional transmission of radio frequency energy in such a way as to interfere with the reception of signals by another station. Interference or jamming (hereinafter referred to as interference signals) is an ever present problem in radio frequency reception.

Radio frequencies cover a band of frequencies at which electromagnetic radiation of energy is useful for communication purposes. The electromagnetic environment through which radio frequency signals travel is very complex. Numerous factors come into play to create this complex environment. The number of radio frequency receivers and transmitters in a given area may be variable. Thus, the interference produced may be single or multiple in location. The physical positioning of these receivers and transmitters may be either stationary or moving. As can be seen, this complex electromagnetic environment produces a condition where interference signals may arise from friendly unintentional sources or from deliberate jamming sources.

Therefore, in radio frequency reception, there exists the problem of receiving a desired or friendly signal while eliminating to the best degree possible all unwanted or interference signals. The problem of enhancing the reception of a desired signal while at the same time substantially eliminating all interference signals has been accomplished through the employment of various prior art techniques.

The two most prominent techniques which have been used singularly or jointly to reduce the impact of unwanted radiation when operation in an interference environment is necessary, are waveform processing and antenna pattern adaptation.

Waveform processing may be further categorized as simple waveform processing and complex waveform processing. In simple waveform processing, the impact of the unwanted signal is reduced through the use of frequency selective filters and limiters. In complex waveform processing, the interference signal is reduced through the use of matched filter or correlation processes. In addition, pseudo noise or frequency hopping making use of frequency spreading techniques can also be employed in the complex method.

Antenna pattern adaptation may be accomplished by the use of a directional high gain antenna pointed in the direction of the desired signal. This method requires a large effective aperture to produce the narrow beam required and has attendant problems with signal acquisition and tracking. An alternative and highly desirable form of adaptive antenna implementation makes use of null formation through interference waveform identification. The antenna pattern developed by this technique is adjusted to throw pattern nulls in the direction of interference sources while the reasonable gain is maintained in the direction of the desired signal.

Each of these methods has its own drawbacks. When using simple waveform processing, the received interference may be inseparable from the desired signal. In addition, the known mechanical techniques for simple waveform processing are not sufficiently rapid in response time. The known electronic phase shift methods cannot provide adequate bandwidth and long term stability. In addition, such systems are excessively complicated.

The various alternative techniques for automatic dynamic antenna null pattern adjustment are costly, very complex, have long adaptation time, and require a prior knowledge of desired signal directions of the rival or signal spectral characteristics to perform the individual antenna adjustment required for signal discrimination. Multiple phase-locked loops have been used to provide phase tracking ability for cancellation adjustment. This approach requires multiple independent phase-locked loops to be used with sufficient loop bandwidth to permit automatic phase tracking and null adjustment. Problems with phase lock stability, signal acquisition, and dynamic individual element phase and magnitude shift or control, contribute to elaborate system alignment and detract from multiple fine null tracking capabilities.

There has been some work done with vector multipliers as a means of eliminating an unwanted signal. This work has been confined to the narrow band and no broadband (one or more octaves) approach for performing vector multiplication of radio frequency signals exist in the prior art. The narrow band technique consists of reactive type phase shifters and electromechanical multiple translation type with translation oscillator phase control or narrow band reactive type phase shifting.

SUMMARY OF THE INVENTION

The subject invention is used for enhancing the reception of a desired radio frequency signal by a receiver while at the samme time nulling out at least one interference radio frequency signal over a broad band. The controlled null may be directed at any azimuth.

An external decision means provides external control instructions to the subject invention. The external decision means can be either manual or automatic, with the external control instructions being generated in response to the enhanced reception of the desired radio frequency signal and the decreased reception of the interference radio frequency signal as received by the receiver. A control processor made up of a clock pulse generator, counters, memories and associated logic circuitry processes the external control instructions to provide a sequence of control signals.

An antenna array acting as a plurality of input means for accepting the desired and interference radio frequency signals. Respective adjustment means in the form of vector multipliers are connected to all of the input means. These vector multipliers act in response to the control instructions from the control processor to adjust the phase and the amplitude of the desired and interference radio frequency signals. A signal combiner connected to the outputs of all of the vector multipliers combines the processed radio frequency signals and conveys these radio frequency signals to the receiver. Specific embodiments of this generalized concept of the steerable antenna null combiner system will be mentioned shortly.

Most contemporary antennas provide an unchanging antenna pattern that is fixed in direction and may be mechanically or electronically steered. The pattern formation used for the steerable antenna null combiner system (hereinafter referred to as the SAN system) differs considerably from this since the patterns are not formed on a fixed predetermined or precalibrated basis. Instead, the patterns are formed, evaluated for performance in the interference environment, and adjusted to maximize their performance. Main beam gain may be substantially sacrificed to permit large reduction in gain in the direction of interference sources. The result is that the SAN system antenna patterns are time and environment dependent with nulls being introduced as needed to optimize the pattern evaluation function.

In one embodiment of the SAN system, signals from the antenna elements of the antenna array pass through vector multipliers into a signal combiner and then out to an external receiver. The vector multipliers are adjusted by outputs from a control processor. The control processor may be operated in two modes: manual or automatic. In manual mode, operation of manual controls causes selection of one particular vector multiplier and changes in its phase and amplitude multiplier settings occur in response to control operation. In automatic mode, the manual controls are locked out and adjustments are automatically performed by the control processor in response to a performance index obtained from an external modem. The performance index supplied by the external modem is the logarithm of the signal-to-interference power ratio. A heuristic processor acts to maximize this selected performance index by sequential adjustment of the vector multipliers.

In another embodiment, employing a two antenna element array, the nulling of interference is achieved by adjustment of both the desired and interference signals as they pass through the SAN system. Both the differential phase and magnitude of the unwanted signal are adjusted so that the unwanted signal from each of the two antennas is precisely 180 degrees out-of-phase and equal in magnitude to the other. When added in the SAN system, the interference signals are substantially reduced.

As can be seen, an object of the subject invention is to provide a system which combines signals from two or more antennas and produces a composite antenna pattern which may be easily shaped to place a null at any direction reducing the effects of an interference signal over a broad band.

A further object is to provide a system with the capability of achieving bandwidths of many octaves while providing digital memory and control for long-term, low-drift operation. As such, the operation speeds of the subject invention are very fast.

A still further object is to provide a system which permits interference reduction with a prior knowledge of interference locations relative to the antenna array.

Other objects and advantages of this invention will further become apparent hereinafter and in the drawings.

The subject invention has many applications in the areas of diversity combining, radio direction finding, and antenna pattern control.

DESCRIPTION OF THE PREFERRED EMBODIMENT

Figure 1:
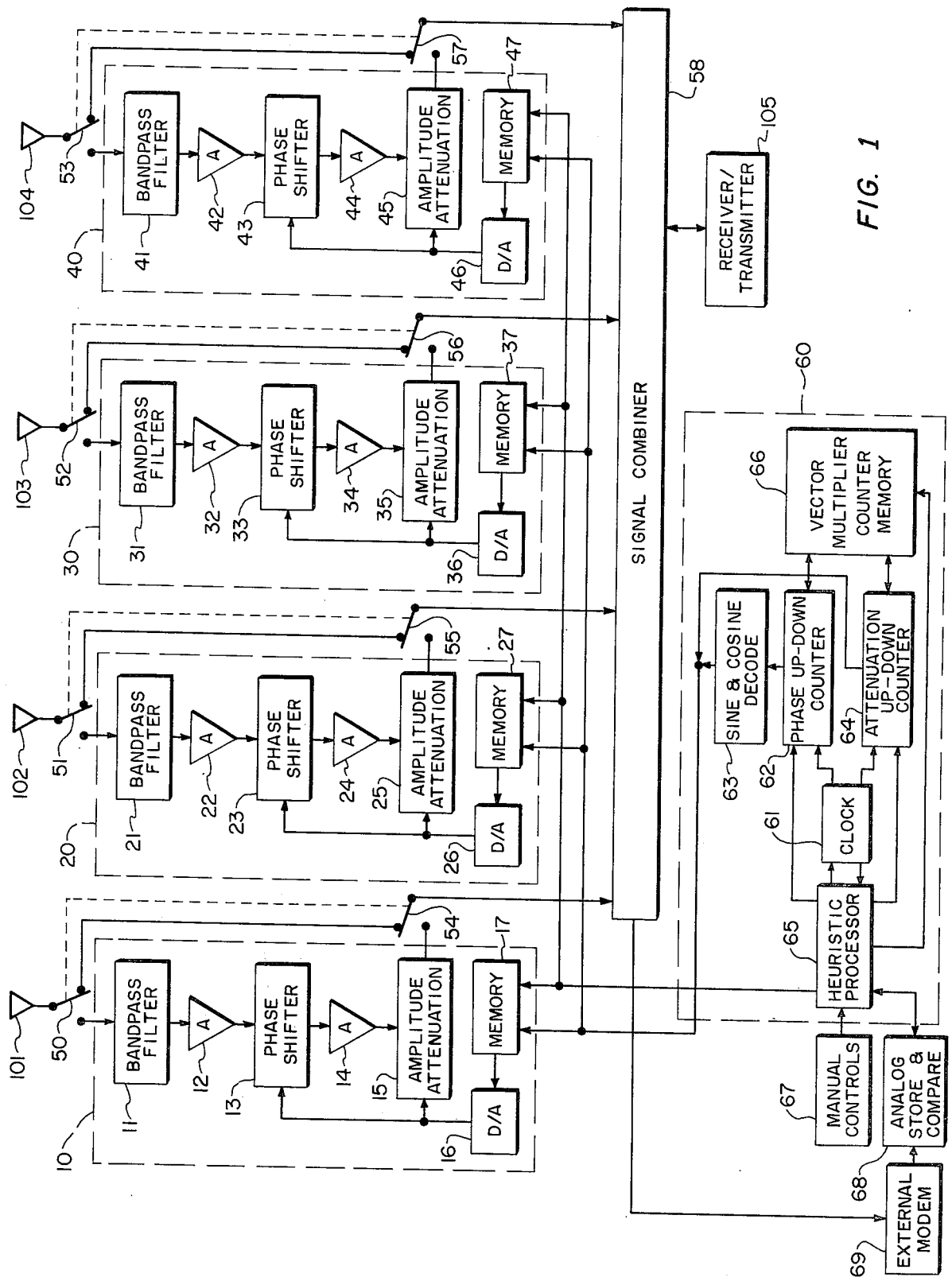
FIG. 1 is a functional block diagram of a preferred embodiment the steerable antenna null combiner system.

In describing the preferred embodiments of the subject invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Referring to FIG. 1, a preferred embodiment of the SAN system is shown. The SAN system consists of a four-element antenna array 101–104. The number of antenna elements, however, may be varied from four. Two or three elements reduces the number of simultaneous interference sources that may be nulled. Five or more elements produce a composite pattern with more separately controllable nulls but complexity and operation times are increased. The elements may be directional in nature rather than omnidirectional. Spacing of elements in the array may be varied from quarter-wave to many wavelengths. The most desirable spacing is noncritical, but spacing on the order of three-eighths of a wavelength provides for good performance characteristics for many applications.

When the SAN system power is off or when an associated transmitter 105 is transmitting, the elements of the antenna array 101–104 are directly coupled to the transmitter 105 through coaxial relay contacts 50–57 and the signal combiner 58. When the SAN system is energized and the transmitter 105 is not energized, signals from the antenna elements 101–104 pass through the vector multipliers 10, 20, 30 and 40 into the signal combiner 58 and then to the receiver 105.

Figure 2:
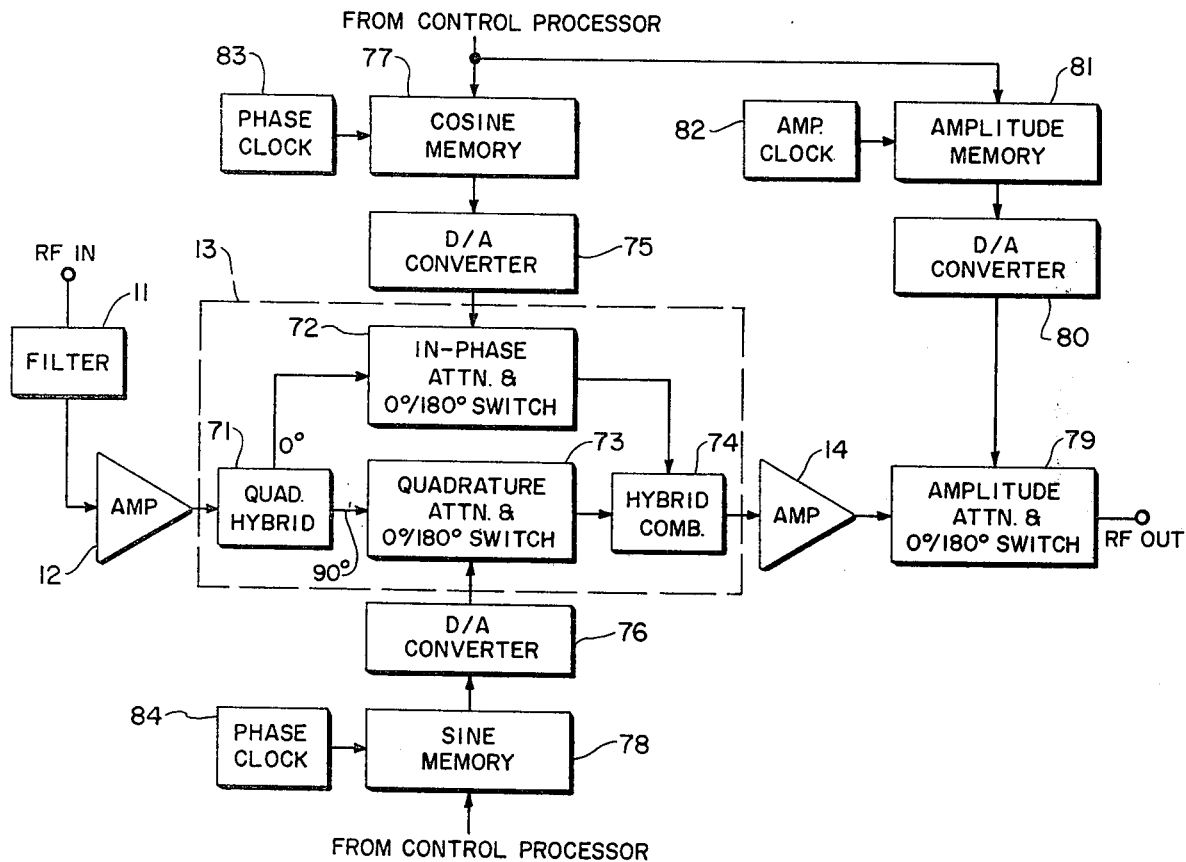
FIG. 2 is a functional block diagram of the vector multiplier.

What follows is a description of the path of a radio frequency signal from one of the antenna elements 101–104 through the corresponding vector multipliers 10, 20, 30 and 40 and then into the signal combiner 58. To simplify the explanation, the first vector multiplier 10 will be used since each of the subsequent vector multipliers 20, 30 and 40 are exactly the same in construction and operation as vector multiplier 10. Reference is made to FIG. 2 in explaining the operation of vector multiplier 10.

A signal enters the vector multiplier 10 through a bandpass filter 11. The signal then passes through amplifiers 12 to aid in maintaining a low noise figure. Next, the signal is split into two components by a broadband quadrature hybrid 71. The two components are equal in power and consist of a 0° component and a 90° component. The 0° component passes through an in-phase attenuator and 0°/180° switch 72 where it is multiplied by the cosine of a desired phase shift angle. The 90° component passes through a quadrature attenuator and 0°/180° switch 73 where it is multiplied by the sine of the desired phase shift angle. The processed components are then summed in a hybrid combiner 74. The resultant effect of this process is that the signal entering the vector multiplier 10 can be phase shifted by any amount through all four quadrants. Control of the two phase shifting attenuators 72 and 73 is provided by two Digital-To-Analog (hereinafter referred to as D/A) converters 75 and 76 respectively. D/A converter 75 is driven by binary stored words in the cosine memory 77 and D/A converter 76 is driven by binary stored words in the sine memory 78. The release of the binary stored words from the memories 77 and 78 is determined by the control processor 60.

After receiving the desired phase shift in the phase shifter 13, the signal is passed through amplifier 14 to recover any amplitude losses experienced and aid in maintaining a low noise figure. The signal then passes through a combination amplitude attenuator and 0°/180° switch 79 where the amplitude of the signal is attenuated and multiplied by either 0° or 180°. The combination amplitude attenuator and 0°/180° switch 79 is driven by D/A converter 80. Amplitude memory 81 drives D/A converter 80 with information received from the control processor 60.

In the vector multipliers 10, 20, 30 and 40 amplifiers 12, 22, 32, 42, 14, 24, 34 and 44 may be omitted thereby reducing intermodulation products. The omission however will increase the noise figure for the vector multipliers 10, 20, 30 and 40. The bandpass filters 11, 21, 31 and 41 may be varied in bandwidth or may consist of relatively narrowband tunable filters that may be tuned to the frequency of operation with the useful overall passband of the vector multipliers 10, 20, 30 and 40.

Figure 3:
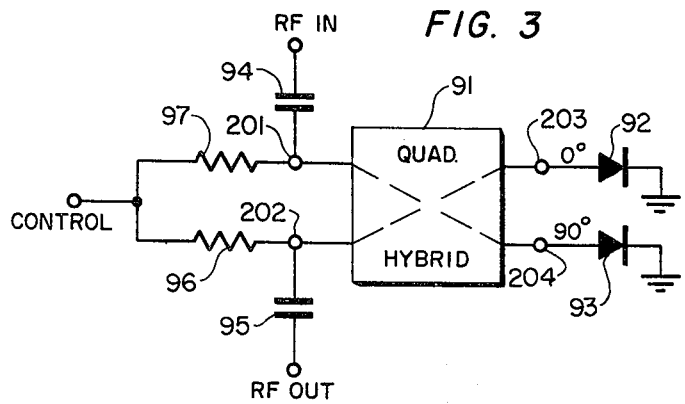
FIG. 3 is a schematic diagram of the basic attenuator and 0°/180° switch.

In the preferred embodiment the in-phase attenuator and 0°/180° switch 72, the quadrature attenuator and 0°/180° switch 73, and the amplitude attenuator and 0°/180° switch 79 are all identical and composed of the elements as shown in FIG. 3. The principle components of the basic attenuator/switch are two PIN diodes 92 and 93 and a single quadrative hybrid 91. Capacitors 94 and 95 are used to isolate the DC control voltages and two resistors 96 abd 97 to isolate the control source from the radio frequency signal. The quadrature hybrid 91 is selected to provide a DC path from one of the input terminals 201 and 202 to one of the output terminals 203 and 204 as shown by the dotted lines in FIG. 3. If operated within specified frequency range, the Pin diodes 92 and 93 provide an RF conductance that varies as a function of the dc current through the diodes. Thus, varying the control current through the diodes from said maximum value to zero would ensure that the RF resistance of the diode would correspondingly vary from a fraction of an ohm to thousands of ohms. The quadrature hybrid 91 has the property that energy entering the input terminal 201 is divided into two quadrature components at the two outputs 203 and 204 and reflections from the two outputs 203 and 204 are combined in phase at the remaining port 202. If the output ports 203 and 204 are terminated correctly, all power is absorbed in the terminations and no reflection occurs. Should the output ports 203 and 204 be terminated in 0 ohms, then total reflection occurs, no power is absorbed, and the RF output port 202 receives all energy (less minor losses) input to the quadrature hybrid 91. When terminating with resistive values greater than the characteristics impedance of the quadrature hybrid 91, the phase of output differs by 180° from the phase of the output when terminating with resistive values less than the characteristic impedance of the quadrature hybrid 91.

The quadrature hybrid 91 was selected with one octave of bandwidth, but quadrature hybrids with narrower bandwidths or with many octaves of bandwidth may be substituted.

The coordinated operation and balancing interrelationship between the vector multipliers 10, 20, 30 and 40 to carry out the nulling process is determined and controlled by the control processor 60. Both manual and automatic control of the SAN is provided for in the control processor 60. In the manual mode operator initiated decisions are placed into the control processor 60 by use of manual controls 67.

In the manual mode of the FIG. 1 embodiment, two controls which make up the manual controls 67 are available to the operator; a vector multiplier stick control, which is a spring loaded five position switch, and an antenna advance pushbutton, which is a simple pushbutton switch. Operation of the stick control may be to the left, right, up or down. The spring returns to center position upon release of the control by the operation. When operated up or down magnitude is controlled. When the antenna advance pushbutton is depressed, a different-vector multiplier 10, 20, 30 or 40 is sequentially selected.

Figure 4:
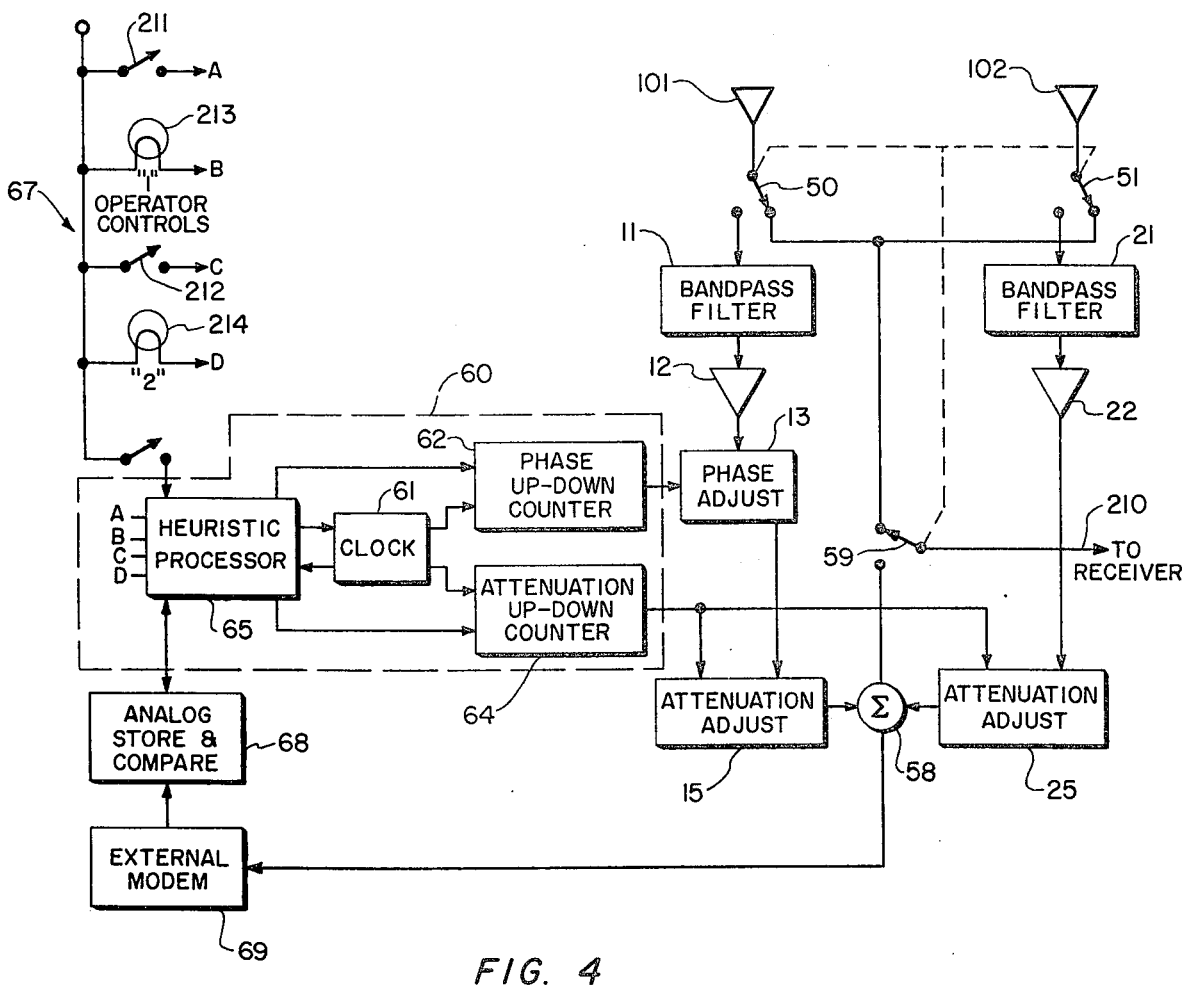
FIG. 4 is a functional block diagram of an additional preferred embodiment of the steerable antenna null combiner system.

The FIG. 4 embodiment employs a different configuration of manual controls 67. The manual controls 67 are limited to two pushbuttons 211 and 212 and two illumination indicators 213 and 214. The first indicator 213 is connected to the heuristic processor 65 and guides the operator activation of the first pushbutton control 211. The second indicator 214 is likewise connected to the heuristic processor 65 and guides operator activation of the second pushbutton control 212. The first and second pushbutton control 211 and 212 are connected to the heuristic processor 65 and provide operator initiated decisions for the selective up-down phase adjustment of the phase up-down counter 62 and up-down attenuation adjustment of the attenuation up-down counter 24.

Other types of manual controls to provide the operator initiated decisions to the heuristic processor 65 would suggest themselves to one skilled in the art. Likewise, the appropriate changes to the control processor circuitry in order to use the FIG. 4 embodiment manual controls in the FIG. 1 embodiment, and vice versa, are obvious to one skilled in the art.

In the automatic mode automatic decisions are placed into the control processor 60 by use of external modem 69 and analog storage and compare circuits 68. The elements involved in the automatic mode will be discussed at a later point in the specification. Suffice it to say at this point, that the elements of the manual mode and the automatic mode perform the function of monitoring the strength of the interference signal, and converting this information into decisions to be acted upon by the control processor 60.

FIG. 1 shows a block diagram of the control processor 60. The heuristic processor 65 guides and controls the operation of the control processor 60. A decision initiated by manual or automatic mode operation is placed into the heuristic processor 65 in the form of an external control instruction. In the manual mode, the heuristic processor 65 converts the instructions from the manual controls 67 into count instructions for the up-down phase counter 62 or the attenuation up-down counter 64. So-called bookkeeping services are provided the heuristic processor 65 through use of the vector multiplier counter memory 66 so that the working counters 62 and 64 may be located with the status of the most immediately accessed vector multiplier 10, 20, 30 or 40. The outputs of the attenuation up-down counter 64 are used directly in the stored word of the vector multiplier memory 17, 27, 37 and 47. The outputs of the phase up-down counter 62 are decoded in the sine and cosine decode 63 to produce sine and cosine binary words, and the decoded outputs are used directly in the stored word of the vector multiplier 17, 27, 37 and 47. Thus, each vector multiplier memory 17, 27, 37 and 47 contains three word segments: sine, cosine, and amplitude.

When operating in the automatic mode, additional functions occur in both the FIG. 1 and the FIG. 4 embodiments. An external modem 69 connected to the combiner means 58 performs a modulation-demodulation operation to identify the desired signal and the interference signal and then produce an output signal which is a logarithmic function of the power ratio of the desired signal to the interference signal (hereinafter referred to as S/I. While the external modem 69 comprises a separate element in this disclosure it should be pointed out that the function performed by the external modem can be formed by a spread spectrum or other waveform modem located within a waveform receiver which can comprise receiver 105. The S/I power ratio is then placed into an analog store and compare circuit 68 which is connected to the heuristic processor 65. In this analog store and compare circuit 68, three operations are carried out. The S/I power ratio output of the external modem is sampled at a rate determined by the heuristic processor 65. The samples are then stored at the same rate. Finally the samples are compared with previously assessed output signal samples to determine whether there has been improvement in the most immediately assessed output signal sample. If improvement occurs, the desirable vector multiplier changes are continued as long as additional improvements is registered. If improvement does not occur, then then attempted change is abandoned and the heuristic process continues.

The objective of SAN operation is to provide optimum adjustment of the vector multipliers 10, 20, 30 and 40 in either manual or automatic modes. In manual mode, the control processor 60 provides the logical interface and bookkeeping needed for the manual controls 67 to correctly adjust the vector multipliers 10, 20, 30 and 40. In automatic mode, the control processor 60 utilizes a heuristic procedure to adjust the vector multipliers 10, 20, 30 and 40 for optimum performance as indicated by the external modem 69.

What follows is a detailed accounting for the implementation and description of the control processor 60 in the FIG. 1 embodiment. Obviously many modifications and variations of the present invention are possible in light of the above teachings. It is therefore to be understood that within the scope of the appended claims, the invention may be practiced otherwise than as specifically described. In presenting the implementation and description of the control processor 60, specialized circuits have been designated with simple symbols. A list of these symbols is given in Table I.

TABLE I

| Designation | Specialized Circuit Designations Description |
|---|---|
| A | Four state resettable address counter for vector multiplier section |
| C | Event Counter for repetitive cycle limitation |
| D | Two state counter with set/reset. Count direction selection: Set, count up; Reset, count down. |
| E | Ten state compare sequencer. Controls pattern comparison. |
| F | Two state counter with set/reset. Function selection: Set, phase; Reset, magnitude. |
| G | Settable data flip-flop. Stores mode selection. |
| H | Eight state manual mode sequencer. Controls manual operation sequences. |
| I | Set/reset flip-flop. Indicates previous successful improvement: Set, improvement; Reset, no improvement. |
| M | 128 state up/down counter with set and reset. Used as phase counter for vector multiplier selected by "A" address counter. |
| P | 128 state up/down counter with set and reset. Used as phase counter for vector multiplier selected by "A" address counter. |
| R | Eight state automatic mode sequencer, controls automatic operation sequences. |
| S | Ten state start mode sequencer, controls initial turn-on operation sequences. |
| SPM | Four address 8 + 8 bit scratch pad memory. Provides uncoded phase and magnitude memory for all vector multipliers. Stores last "M" and "P" counter settings for each vector multiplier. |
| VM | 8 + 8 + 8 bit latch memory. Provides coded drives for phase and magnitude control in vector multiplier. |

Three sequencers (S, H and R) control the time sequential accessing of logic functions for the three modes of operation (start, manual, and automatic respectively). The start sequencer provides the necessary initial power turn-on logic accesses to ensure that all memories, counters, and flip-flops have valid initial settings. The start sequencer prevents manual or automatic operation until completion of the start sequence. The manual sequencer ensures that operator initiated changes of the manual controls 67 are admitted at only valid times and that proper logic sequence is initiated. The manual sequencer runs continually as long as the start mode is completed and the SAN is in manual mode. The automatic sequencer ensures the proper sequence of the heuristic process incorporated for automatic run and prevents mode change to manual at incorrect times. The automatic sequencer runs continually so long as the start mode is completed and the SAN is in an automatic mode. Referring to FIGS. 5–8, the sequencer states are given by an alpha character (S, H, or R) followed by a numeric character (0, 1, 2, etc.). The alpha character designates the sequencer in use and the numeric character designates the current sequencer state. All logic operations following a sequencer state designation and occurring before the next sequencer state designation are performed during the sequencer state first appearing.

The start sequence of the control processor 60 is initiated by application of power to the SAN system. The power application is usually made by operation of the mode selector switch, which is part of the manual controls 67. As this switch is rotated from "off" to "manual" the start sequence delays operation to permit all circuitry to assume proper operating potentials and then commences a series of operations that ensure that all counters and all memories have standardized initial values. The time required for the start sequence is approximately 10 milliseconds. All vector multipliers 10, 20, 30 and 40 are set to zero phase shift and attenuation, providing an array antenna pattern that can be re-initiated at any time by turning the SAN system off and then on. Within the following paragraphs, the occurrences within each sequence state will be presented in tabular form. The sequencer state heads each section.

Figure 5:
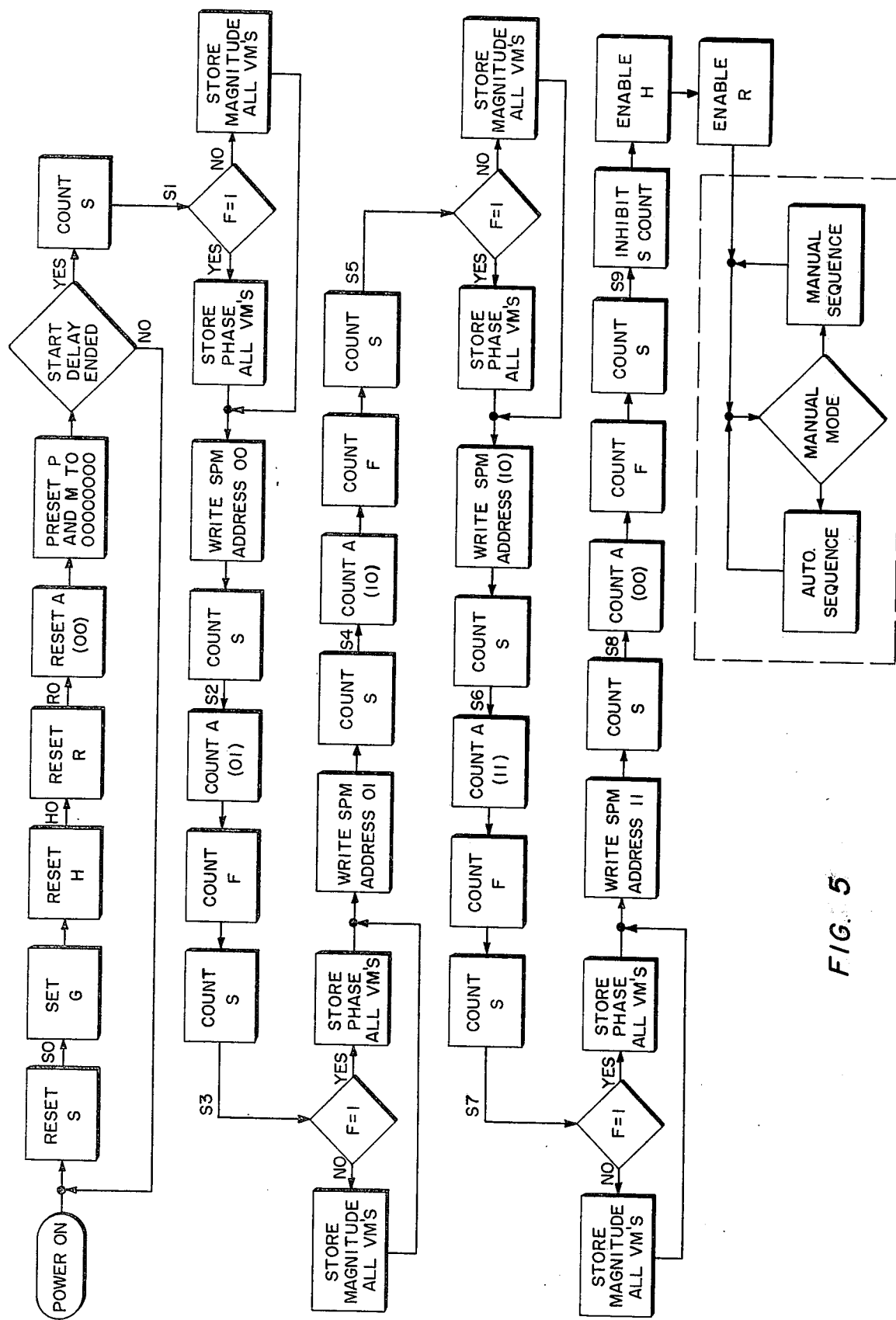
FIG. 5 is a function flow diagram of the manual sequence for the FIG. 1 embodiment.

FIG. 5 illustrates start sequence in logic flow diagram form.

S0 — Start sequencer is set to S0. Mode selection storage (G) is set to manual. Manual sequencer is set to H0 and inhibited. Automatic sequencer is set to R0 and inhibited. Address counter (A) is reset to 00. Working counters P and M are preset to 00000000. State S0 is maintained until the 10ms start delay is completed.

S1 — If the function selector (F) is phase, all vector multiplier since latch memories are set to 01111100 and all cosine latch memories are set to 000000000. If F is magnitude, all vector multiplier magnitude latch memories are set to 00000000. At scratch pad memory address 00, phase is written 00000000 and magnitude is written 00000000.

S2 — Address counter (A) is counted to 01. Function selector (F) is changed from phase to magnitude or from magnitude to phase.

S3 — VM storage as at S1. At scratch pad memory address 01, phase is written 00000000 and magnitude is written 00000000.

S4 — Address counter (A) is counted to 10. Function selector (F) is changed from magnitude to phase or from phase to magnitude.

S5 — VM storage as at S1. At scratch pad memory address 10, phase is written 00000000 and magnitude is written 00000000.

S6 — Address counter (A) is counted to 11. F changes as in S2.

S7 — VM storage as at S1. At scratch pad memory address 11, phase is written 00000000 and magnitude is written 00000000.

S8 — Address counter (A) is counted to 00. F changes as in S4.

S9 — Further steps of the S sequencer are inhibited. Inhibition on H sequencer is removed. Inhibit on R sequencer is removed.

If G is set to manual when the start sequence is completed, entry into the manual sequencer cycle is made. This cycle continues repetitively until G has been reset. Two controls which make up the manual controls 67 are available to the operator: the vector multiplier stick control and the antenna advance pushbutton. Operation of the stick control may be to the left, right, up or down with spring return to center position upon release of the control by the operator. When operated up or down, magnitude is controlled. When operated right or left, phase is controlled. When the antenna advanced pushbutton is depressed, the antenna or vector multiplier manual is 00, 01, 10, 11, 00, . . . which corresponds to antenna channels A1, A2, A3, A4, A1 . . . .

Figure 6:
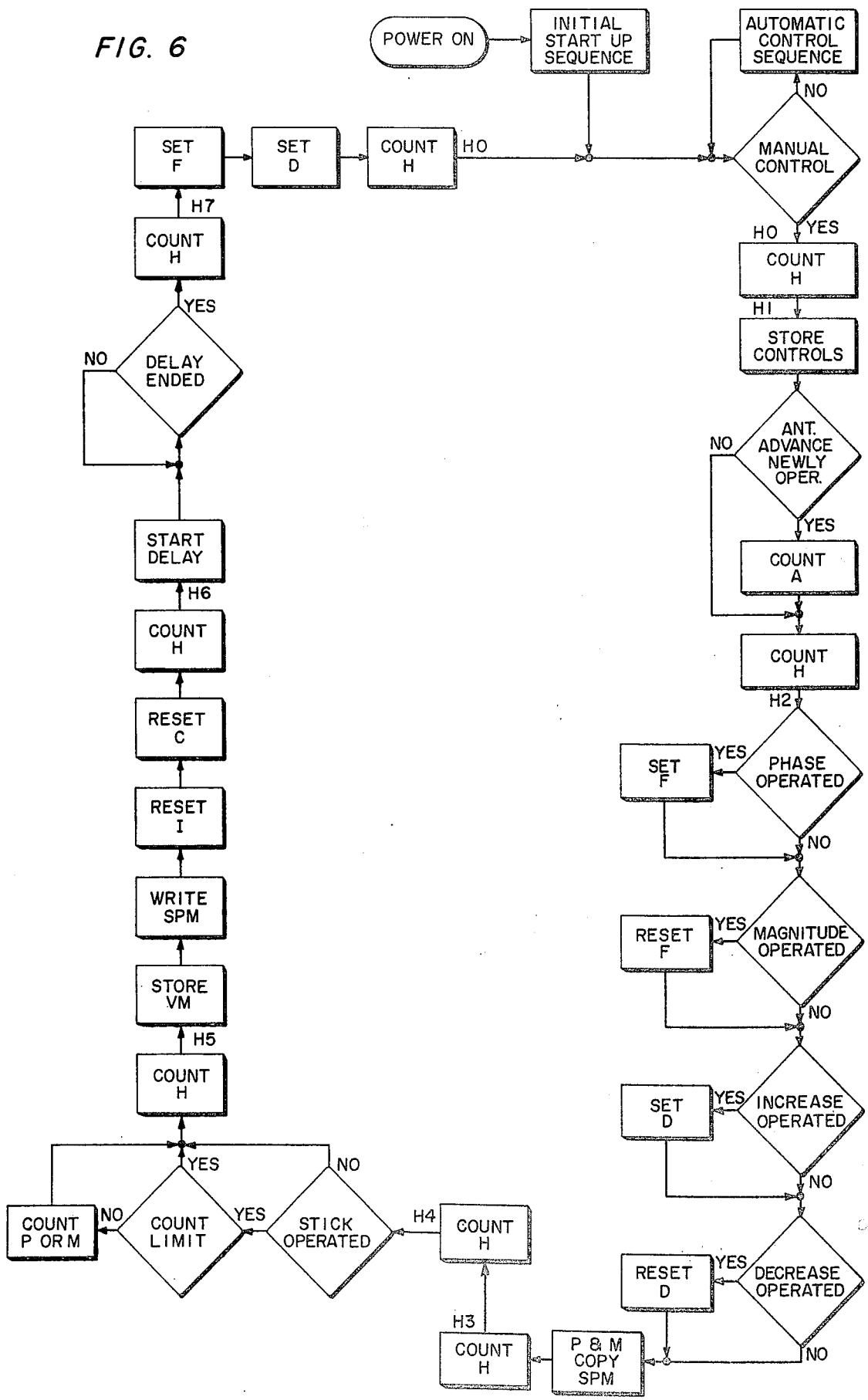
FIG. 6 is a functional flow diagram of the manual sequence for the FIG. 1 embodiment.

The manual sequence is designed to provide direct operator control of the same elements controlled by the automatic process. Since operator response time is much greater than for the external modem 69, a delay interval is inserted to permit operator observation and decision. This delay time is made to decrease to a minimum value as the operator holds the stick control off center thus providing a rapid slew feature for initial adjustments. Release of the control restores the normal rate. Within the following paragraphs, the occurrences within each sequence state will be presented in tabular form. The sequence state heads each section. FIG. 6 illustrates the manual sequence in logic flow diagram form.

H0 — Manual sequencer is inhibited in this state until mode selection (F) is set and S9 achieved.

H1 — VM address counter incremented if antenna advance control is newly operated. Settings of operator control stick stored.

H2 — If stick control is right or left, F is set. Changes will be in phase. If stick control is up or down, F is reset. Changes will be in magnitude. If stick is right or up, D is set. Count will increase. If stick is left or down, D is reset, count will decrease. Up-down phase and magnitude counters are loaded with scratch pad memory contents for address selected by A.

H3 — Pause.

H4 — If stick is operated and F is set, increment phase counter up or down as indicated by D. If stick is operated, F is reset and magnitude count limit will not be exceeded, increment magnitude counter up or down as indicated by D.

H5 — If F is set, store sine and cosine words in addressed VM. If F is reset, store magnitude word is addressed VM. Write both P and M counter words at address in SPM to save latest settings. Reset I for possible automatic mode entry. Reset C for possible automatic mode entry.

H6 — Pause for operator accommodation delay period.

H7 — Set F for possible automatic mode entry. Set D for possible automatic mode entry.

H0 — If G is reset, hold for G restoration to set after termination of automatic mode. If G is set, manual mode is continued to H1.

Completion of the start sequence and reset of G to automatic permits entry into the automatic sequencer cycle. This cycle will continue repetitively until G has been set to manual. No operator access is permitted other than change of mode selection to manual or to off at interval R0.

Figure 7:
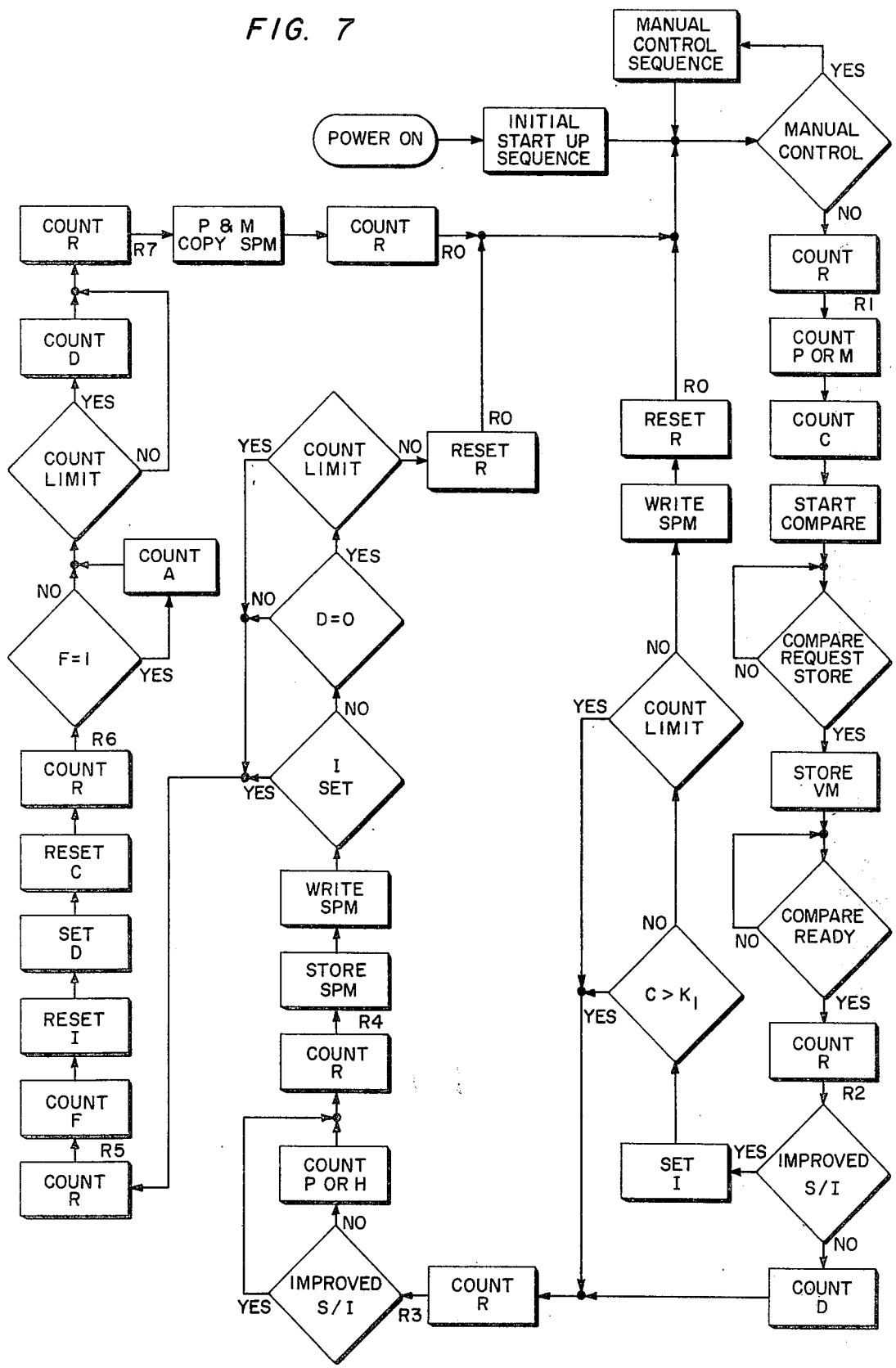
FIG. 7 is a functional flow diagram of the automatic sequence for the FIG. 1 embodiment.

The Automatic Sequence Diagrammed in FIG. 7 is designated to provide automatic convergence on the optimum desired signal to interference signal through the use of an external modem 69. The modem output is examined through the use of a "compare" procedure and a decision is made within that procedure whether or not improvement in S/I has occurred with the latest VM change. Based upon the improvement decision, the automatic process continues through a heuristic process in attempting to maximize the S/I. The vector multipliers 10, 20, 30 and 40 are sequentially accessed. With each vector multiplier access, adjustment is first attempted in phase and, after failure or a certain amount of success, then in magnitude. The number of phase or magnitude samples for continued success in S/I improvement is limited by the event counter (C) for each antenna element. when this counter reaches a predetermined count K1, the automatic cycle is altered to change the function from phase to magnitude or the reverse. Since K1 is jumpered to the (C) counter first output stage, phase or magnitude is sampled twice for each antenna channel at logic sequence time R1 and R4. As in the two preceding sections, the occurrences within each sequence state will follow in tabular form with the sequence state heading each section.

R0 — Automatic sequence is inhibited in this state until mode selection (G) is reset and S9 achieved.

R1 — If F is set, the phase counter is incremented in the direction determined by D. If F is reset, the magnitude counter is incremented in the direction determined by D. Event counter C is incremented by one. The compare procedure is commenced. When requested by compare, the sine and cosine words (if F is set) or the magnitude word (if F is reset) is stored within the addressed VM to initiate the pattern change to be evaluated. R is inhibited until compare is ready.

R2 — If S/I improved, Set I. If S/I was not improved, D is incremented to change count direction. If S/I is improved and even counter C is less than $K_1$ and F is set or F is reset with count limit for M not reached, then the M and P words are written into the SPM at the address specified by A and the next interval of the automatic sequencer is R0.

R3 — If S/I did not improve and F is set, then the phase counter is incremented in the direction indicated by D to recover the original pattern settings or, if F is reset, the magnitude counter is incremented in the direction indicated by D to recover the original pattern settings.

R4 — If F is set, sine and cosine words are stored in the addressed vector multiplier recovering the original pattern. If F is reset, the magnitude word is stored in the addressed vector multiplier recovering the original pattern. Both P and M words are stored in the SPM area addressed by A. If I is reset (no previous improvement has occurred) D = 0 and (count direction is down) and if F is reset and no count limit is encountered or if F is set, then the next R state is R0.

R5 — F is counted to change function from phase to magnitude or from magnitude to phase. I is reset to no improvement for the newly selected function. D is set to start first try at increase of F selected counter. C is reset to permit correct limit count on new function repetitive cycle.

R6 — If the newly selected function is phase, the address counter is incremented (a new VM must be manipulated). If count limit has occurred with F reset, D is incremented to change direction of count to down.

R7 — Addressed phase and magnitude words in SPM are preset into P and M counters.

R0 — Automatic sequence continues if mode selection (G) remains reset.

The compare sequence is designed to provide automatic evaluation of two time sequential antenna patterns in an interference environment. Compare is invoked by the automatic sequencer, R. When invoked, the compare sequencer E inhibits R from further operation until the compare sequence is completed. The evaluation is based upon the output of the external modem 69. The modem output provides a log S/I output voltage that provides a figure of merit for the antenna pattern in use. To provide the needed comparison, the voltage representing the figure of merit for a reference antenna pattern is first stored, the pattern changed, and then the voltage representing the figure of merit for the changed pattern is stored. Comparison of the two figure of merit voltages permits the best performng pattern to be selected. The comparison operation utilizes analog techniques with a binary storage of results.

Figure 8:
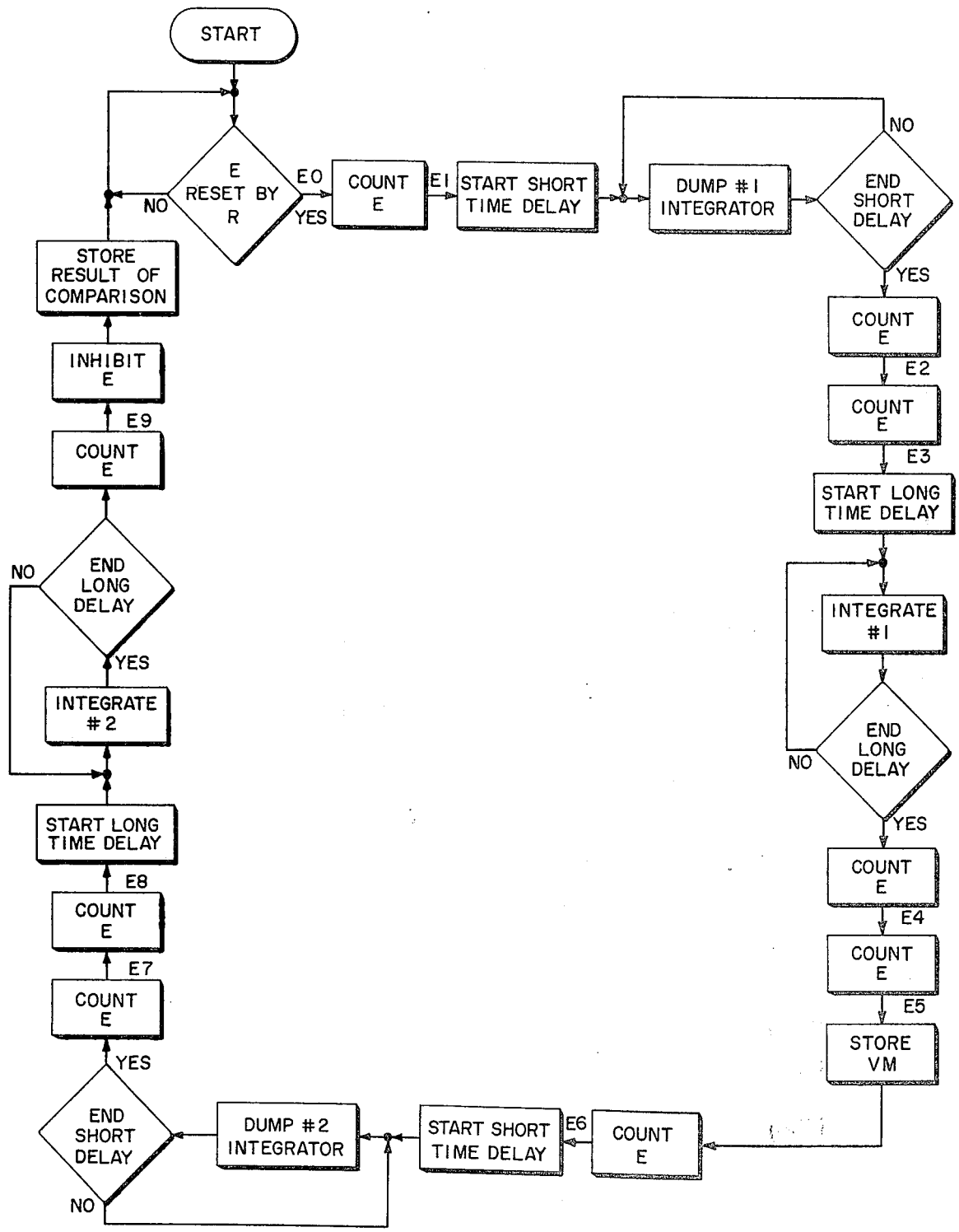
FIG. 8 is a functional flow diagram of the compare sequence for the FIG. 1 embodiment.

The details of the compare sequence are shown in FIG. 8. Occurences within each compare sequence state are presented in the following paragraphs with the sequence state heading each section.

E9 — Compare is inhibited in this state until reset by the automatic sequencer.

E0 — For sequence control purposes.

E1 — The first integrator is dumped for a predetermined period of time. E is inhibited until timeout completion.

E2 — Guard period to prevent/dump integration overlap.

E3 — The log S/I obtained by the modem is input into the first integrator for a predetermined period of time. E is inhibited until timeout completion.

E4 — Guard period to prevent integrate/store VM overlap.

E5 — The change in pattern is obtained by transferring the contents of the up-down counter previously changed by R into the selected vector multiplier.

E6 — The second integrator is dumped for a predetermined period of time. E is inhibited until timeout completion.

E7 — Guard period to prevent dump/integration overlap.

E8 — The log S/I obtained by the modem is input into the first integrator for a predetermined period of time. E is inhibited until timeout completion.

E9 — The results of integrator comparison are stored as a binary number. E is inhibited until the next E reset by R.

An additional embodiment of the SAN unit is shown in FIG. 4. In this embodiment the antenna array consists of only two antennas 101 and 102. While the signals from antenna 101 can be changed in magnitude and phase, the signals from antenna 102 are changed in magnitude only. Two antennas 101 and 102 external to the SAN system are used. These may be of any useful type and will give better results when spaced approximately three-eighths wavelength apart. Typical antennas are center-fed whips with associated tuners. When the SAN system power is off, the antennas 101 and 102 are shorted together by switches 50, 51 and 59 and connected to the SAN system output connector 210 by-passing the RF channels. When the SAN system power is on, the signals flow as follows. The signals from antenna 102 pass through bandpass filter 21, wideband linear amplifier 22, and attenuation adjust 25 to the summer 58. From antenna 101, the signals pass through bandpass filter 11, wideband linear amplifier 12, phase adjust 13, and attenuator adjust 15 to the summer 58. Signals from antenna 102 can be changed in magnitude and phase. Signals from antenna 102 are changed in magnitude only. At the summer 58, signals from the same sources are coherent and add as vectors so that the phase 13 and attenuation adjustments 15 and 25 may be made to cancel out a selected signal by making the selected signal from antenna 102 180° out of phase with that signal from antenna 102 by adjusting phase adjust 13 and by making the magnitude of the signal from the antennas 101 and 102 equal at the summer 58 by adjustment of 15 and 25. The phase adjust 13 is controlled by a phase up-down counter 62. Magnitude adjusts 15 and 25 are controlled by an attenuation up-down counter 64. The counters 62 and 64 are separately controllable from the heuristic processor 65. The clock 61 supplies the timing intervals required by the digital logic of the heuristic processor 65. Operation of the controls, pushbuttons 211 and 212 provide necessary input instructions to the heuristic processor 65 from the operator. Indicators 213 and 214 are illuminated sequentially by the heuristic processor 65 to indicate to the operator the pushbutton 211 and 212 status.

The heuristic processor 65 operates with decisions initiated by actuation of the manual controls 67 to control the phase shifts and gain adjustments needed to null the undesired interference. The control process is shown in FIG. 9, which shows the relationship between operator actuation of the manual controls 67, heuristic processor 65, illumination of the indicators 213 and 214, internal information storage, and resultant internal action of the control processor 60.

Figure 9:
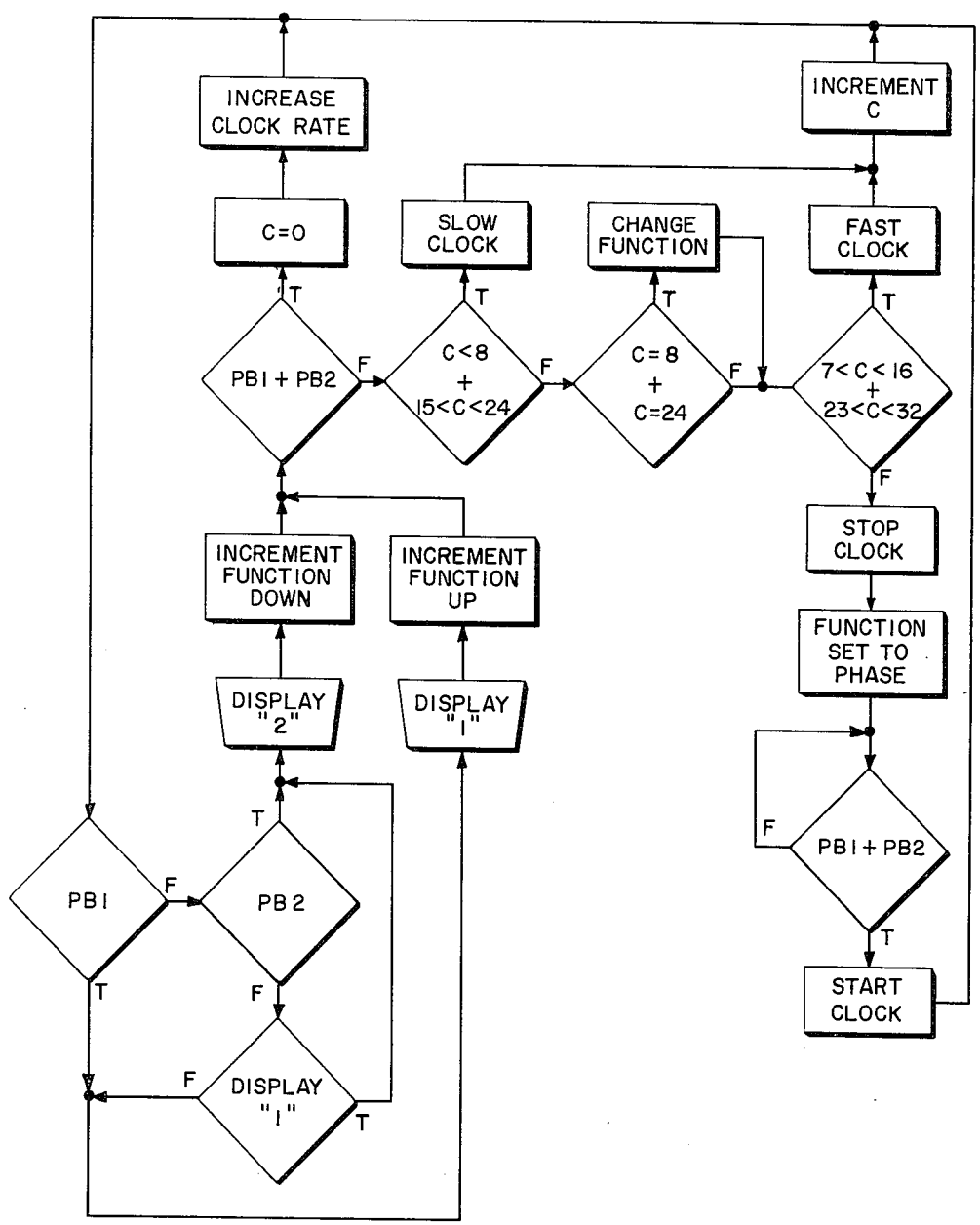
FIG. 9 is a functional flow diagram of the manual sequence for the FIG. 5 embodiment.

The initial starting point is the decision block PB1 + PB2 located in the lower right corner of FIG. 9. When neither pushbutton/indicator is depressed, the decision is false and testing of the pushbutton condition continues indefinitely. When either pushbutton is depressed, a true is returned and the clock is started. For the example following, PB1 is assumed to be depressed. Control now moves to the PB1 decision block. This block produces a true and the display memory is set to Display 1 (the left pushbutton) indicator is illuminated. Since the function selected upon startup is phase, the phasecounter is next incremented to increase in count. Testing of the PB1 + PB2 decision block results in a true and the counter C is set to zero and the clock rate increased. (Successive increases in clock rate provide the fast slewing capability). Again, the decision block PB1 is tested and the cycle continued until the pushbutton PN1 is released.

When PB1 is released, the PB1 decision block at the left side of FIG. 3 is again tested but returns a false resulting in testing of PB2. This decision block also returns false since neither pushbutton is depressed and Display 1 is tested returning a true. The display memory is then set to Display 2 and the phase counter decremented one step. Since the PB1 + PB2 block now returns a false, C < 8 + 15 < C < 24 is tested with true resulting in "slow clock". The clock rate is now restored to the slowest rate. The time counter C is then incremented from 0 to 1 and control returns to the PB1 block. Since PB1 and PB2 again return false, Display 1 is again tested returning a false and causing the display memory to Display 1. The phase counter is incremented up one count. The alternate cycling of Display 1 and Display 2 and the corresponding increase or decrease in the count of the phase counter continues until the time counter C reaches a count of 8. At this time, the decision block C < 8 +15 < C < 24 returns a false and the decision block C = 8 + C = 24 returns a true causing the function to change from phase to magnitude. The decision block 7 < C < 16 +23 < C < 32 returns a true and the clock now runs at a fast rate and will cause the display indicators to give fast flashing to indicate the change of function. The time counter C is incremented from 8 to 9 and the cycle continues. Fast flashing will be terminated when C reaches 16 and slow flashing will permit adjustments in magnitude. When a count of 24 is reached, fast flashing again results and if no pushbutton is depressed, the clock is stopped and the function set to be phase. The cycle may be re-initiated at any time by momentary or continuous depression of either pushbutton.

To convert this embodiment of the SAN system to fully automatic operation, the external modem 69 and the analog storage and compare unit 68 are connected to the heuristic processor 65 in place of the manual controls 67. The operation of the external modem 69 and the analog store and compare unit 68 for this embodiment is the same as previously explained.

For automatic operation of this embodiment, minor changes are also required in the heuristic processor 65. Additional gates must be provided to make use of both the manual controls 67 in the manual mode and the external modem 69 and the analog store and compare unit 68 in the automatic mode.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. For use with a radio frequency receiver, a steerable antenna null combiner system for enhancing reception of a desired radio frequency signal, characterized by a phase component and an amplitude component, while at the same time nulling out at least one interference radio frequency signal, characterized by a second phase component and a second amplitude component, over a broad band comprising:
   a. external decision means for providing external control instructions, said external decision means responsive to the enhanced reception of said desired radio frequency signal and the decreased reception of said interference radio frequency signal as received by said radio frequency receiver;

b. control processor means responsive to said external decision means for converting said external control instructions into a sequence of control signals;

c. a plurality of input means for accepting said radio frequency signals;

d. respective adjustment means connected to all but one of said input means and responsive to said control signals from said control processor for adjusting said phase components and said amplitude components of said ratio frequency signals;

e. second adjustment means connected to said one of said input means and responsive to said control signals from said control processor for adjusting at least said amplitude components of said radio frequency signals; and f. combiner means connected to the outputs of all of said adjustment means for combining said radio frequency signals and for conveying said combined radio frequency signals to said receiver.

2. The steerable antenna null combiner system according to claim 1 wherein said second adjustment means further comprises means responsive to said control signals from said control processor for adjusting said phase components of said radio frequency signals.

3. The steerable antenna null combiner system according to claim 2 wherein said respective adjustment means and said second adjustment means are each comprised of:

a. first filter means in circuit with one of said input means for selectively passing said radio frequency signals within a desired frequency range;

b. phase shifting means in circuit with said first filter means for shifting the phase of said radio frequency signals by any desired angle;

c. amplitude attenuation means in circuit with said phase shifting means for adjusting the amplitude of said ratio frequency signals;

d. output means in circuit with said amplitude attenuation means for providing an output for said radio frequency signals;

e. phase shift control means responsive to said control processor means and connected to said phase shifting means for activating said phase shifting means; and f. amplitude attenuation control means responsive to said control processor means and connected to said amplitude attenuation means for activating said amplitude attenuation means.

4. The steerable antenna null combiner system according to claim 3 wherein said respective adjustment means and said second adjustment means are each further comprised of:

a. first amplifier means connected to said first filter means and said phase shifting means for increasing the power associated with said signals; and b. second amplifier means connected to said phase shifting means and said amplitude attentuation means for increasing the power associated with said signals.

5. The steerable antenna null combiner system according to claim 3 wherein said phase shifting means comprises:

a. means in circuit with said first filter means for splitting said signal into first and second components which are equal in power but differing by 90°;

b. means in circuit with said splitting means and connected to said phase shift control means for multiplying said first component by cosine multiplication factors variable from +1 to −1 as controlled by said phase shift control means;

c. first switching means in circuit with said cosine multiplication means and connected to said phase shift control means for shifting said first component by either 0° or 180° as controlled by said phase shift control means;

d. means in circuit with said splitting means and connected to said phase shift control means for multiplying said second component by sine multiplication factors variable from +1 to −1 as controlled by said phase shift control means;

e. second switching means in circuit with said sine multiplication means and connected to said phase shift control means for shifting said second component by either 0° or 180° as controlled by said phase control means; and f. means connected to said first and second switching means and in circuit with said amplitude attenuation means for recombining said first and second components.

6. The steerable antenna null combiner system according to claim 3 wherein said phase shift control means comprises:

a. phase digital-to-analog converting means connected to said phase shifting means for generating analog currents to drive said phase shifting means;

b. phase memory means connected to said phase digital-to-analog converting means and said control processor means for storing a quantity of binary phase shift control words; and c. phase clock means connected to said phase memory means for generating count pulses to regulate the storage rate of said binary words in said phase memory means.

7. The steerable antenna null combiner system according to claim 3 wherein said amplitude attenuation control means comprises:

a. amplitude digital-to-analog converting means connected to said amplitude attenuation means for generating analog currents to drive said amplitude attenuation means;

b. amplitude memory means connected to said amplitude digital-to-analog converting means and said control processor means for storing a quantity of binary amplitude attenuation control words; and c. amplitude clock means connected to said amplitude memory means for generating count pulses to regulate the storage rate of said binary words in said phase memory means.

8. The steerable antenna null combiner system according to claim 3 wheren said phase shift control means comprises:

a. cosine digital-to-analog converting means connected to said cosine multiplication means for generating analog currents to drive said cosine multiplication;

b. cosine memory means connected to said cosine digital-to-analog converting means and said control processor means for storing a quantity of binary cosine multiplication control words;

c. said clock means connected to said cosine memory means for generating count pulses to regulate the storage rate of said binary cosine multiplication control words;

d. since digial-to-analog converting means connected to said sine multiplication means for generating analog currents to drive said sine multiplication means;

e. sine memory means connected to said cosine digital-to-analog converting means and said control processor means for storing a quantity of binary sine multiplication control words; and f. sine clock means connected to said sine memory means for generating count pulses to regulate the storage rate of said binary sine multiplication control words.

9. The steerable anenna null combiner system according to claim 3 wherein said control processor means comprises:

a. clock means for generating a plurality of clock pulses at a desired clock rate;

b. heuristic processor means responsive to said external decision means and operable at said clock rate for providing count instructions;

c. phase up-down counter means responsive to said heuristic processor means and operable at said clock rate for generating phase count pulses to activate each of said phase control means;

d. attenuation up-down counter means responsive to said heuristic processor means and operable at said clock rate for generating attenuation count pulses to activate each of said attenuation control means; and e. adjustment counter memory means connected to said phase up-down counter means and said attenuation up-down counter means and operable at said clock rate for providing said phase up-down counter means and said attenuation up-down counter means with the status of the most immediately assessed adjustment means.

10. The steerable antenna null combiner system according to claim 9 wherein said phase count pulses and said attenuation count pulses are binary words.

11. The steerable antenna null combiner system according to claim 9 wherein said control processor means further comprises:

a. sine and cosine decode means connected to said phase updown counter means and each of said phase control means for decoding said phase count pulses into sine and cosine binary words to activate each of said phase control means.

12. The steerable antenna null combiner system according to claim 11 wherein said external decision means further comprises:

a. indicator means responsive to said heuristic processor for guiding operator activation of said manually activated control means.

13. The steerable antenna null combiner system according to claim 11 wherein said manually activated control means comprises:

a. first manually activated decision input means connected to said heuristic processor for providing operator initiated decisions to said heuristic processor for selective up phase adjustment of said phase up-down counter means and up attenuation adjustment of said attenuation up-down counter means; and b. second manually activated decision input means connected to said heuristic processor for providing operator initiated decisions to said heuristic processor for selective down phase adjustment of said phase up-down counter means and down attenuation adjustment of said attenuation up-down counter means.

14. The steerable antenna null combiner system according to claim 12 wherein said indicator means comprises:

a. first indicator means connected to said heuristic processor for guiding operator activation of said first manually activated decision input means; and b. second indicator means connected to said heuristic processor for guiding operator activation of said second manually activated decision input means.

15. The steerable antenna null combiner system according to claim 9 wherein said external decision means comprises:

a. logarithmic forming means connected to said combiner means for identifying said desired signal and said interference signal, and then producing an output signal which is a logarithmic function of the power ratio of said desired signal to said interference signal;

b. sampling means connected to the output of said logarithmic forming means and responsive to said heuristic processor and operable at said clock rate for sampling said output signal;

c. storing means connected to said sampling means and responsive to said heuristic processor for storing said output signal samples at said clock rate; and d. comparing means connected to said storing means and responsive to said heuristic processor at said clock rate for comparing said output signal samples with previously assessed output signal samples to determine whether there has been improvement in said most immediately assessed output signal sample and for providing said determination to said heuristic processor for selective up-down phase and up-down attenuation adjustment of each of said adjustment means.

16. The steerable antenna null combiner system according to claim 15 wherein said compare means further comprises analog conversion means connected to said heuristic processor for converting said determination into analog signals for acceptance by said heuristic processor.

* * * * *